United States Patent
Cazanas et al.

(10) Patent No.: US 9,106,803 B2
(45) Date of Patent: Aug. 11, 2015

(54) BROADCAST MEDIA INFORMATION CAPTURE AND COMMUNICATION VIA A WIRELESS NETWORK

(75) Inventors: Carlos A. Cazanas, Bethlehem, PA (US); Azam Khan, Franklin Park, NJ (US); Brian F. Tims, Nazareth, PA (US)

(73) Assignee: Cellco Partnership, Basking Ridge, NJ (US)

( * ) Notice: Subject to any disclaimer, the term of this patent is extended or adjusted under 35 U.S.C. 154(b) by 548 days.

(21) Appl. No.: 12/512,627

(22) Filed: Jul. 30, 2009

(65) Prior Publication Data

US 2011/0028128 A1 Feb. 3, 2011

(51) Int. Cl.
| | |
|---|---|
| H04M 3/42 | (2006.01) |
| G06F 15/16 | (2006.01) |
| H04N 7/173 | (2011.01) |
| H04N 21/258 | (2011.01) |
| H04N 21/262 | (2011.01) |
| H04N 21/414 | (2011.01) |
| H04N 21/422 | (2011.01) |
| H04N 21/472 | (2011.01) |
| H04N 21/658 | (2011.01) |

(Continued)

(52) U.S. Cl.
CPC ..... *H04N 7/17327* (2013.01); *H04N 21/25866* (2013.01); *H04N 21/26258* (2013.01); *H04N 21/41422* (2013.01); *H04N 21/42202* (2013.01); *H04N 21/47214* (2013.01); *H04N 21/6581* (2013.01); *H04N 21/6582* (2013.01); *H04N 21/8113* (2013.01); *H04H 60/74* (2013.01); *H04H 2201/13* (2013.01)

(58) Field of Classification Search
USPC ............. 455/412.1, 414.1, 414.3; 425/42, 45, 425/55, 57, 99; 709/203
See application file for complete search history.

(56) References Cited

U.S. PATENT DOCUMENTS

| 6,446,080 B1 * | 9/2002 | Van Ryzin et al. ................... 1/1 |
| 7,345,232 B2 | 3/2008 | Toivonen et al. |

(Continued)

FOREIGN PATENT DOCUMENTS

| WO | 01/67753 | 9/2001 |
| WO | WO02/23773 A2 | 3/2002 |

(Continued)

OTHER PUBLICATIONS

European Search Report from corresponding EP Application No. 10008016.7 dated Nov. 4, 2010.

(Continued)

*Primary Examiner* — Kent Chang
*Assistant Examiner* — Scott Au

(57) ABSTRACT

An accessory device, such as a mobile telematics unit, captures tags for user desired media content items from a content broadcast, such as a digital radio broadcast or television broadcast. Each tag provides one or more parameters for identification of a song or other audio selection. The accessory device sends each tag over a mobile communications network air interface, with an identifier of an account of a mobile communications network subscriber. A server receives such tag transmissions and compiles a list of one or more tags directly from the accessory device, for the subscriber on the identified mobile service account. In some situations, the server generates a playlist from the stored list of tags and communicates at least a portion of the playlist to a personal media device, upon access by the personal media device to the subscriber's account.

31 Claims, 5 Drawing Sheets

(51) Int. Cl.
*H04N 21/81* (2011.01)
*H04H 60/74* (2008.01)

(56) References Cited

U.S. PATENT DOCUMENTS

| | | | |
|---|---|---|---|
| 7,698,297 B2* | 4/2010 | Jawa et al. | 707/713 |
| 2002/0049037 A1 | 4/2002 | Christensen et al. | |
| 2002/0183059 A1* | 12/2002 | Noreen et al. | 455/427 |
| 2004/0203406 A1 | 10/2004 | Moran et al. | |
| 2005/0098023 A1 | 5/2005 | Toivonen et al. | |
| 2005/0176366 A1 | 8/2005 | Levy | |
| 2006/0235864 A1 | 10/2006 | Hotelling et al. | |
| 2007/0061215 A1 | 3/2007 | Waites | |
| 2007/0281606 A1* | 12/2007 | Baunach | 455/3.06 |
| 2008/0104246 A1 | 5/2008 | Katz et al. | |
| 2008/0160967 A1* | 7/2008 | Narasimhan et al. | 455/414.1 |
| 2008/0188209 A1* | 8/2008 | Dorogusker et al. | 455/414.2 |
| 2008/0218409 A1* | 9/2008 | Moinzadeh et al. | 342/357.06 |
| 2008/0293393 A1 | 11/2008 | Hartmaier | |
| 2009/0036091 A1* | 2/2009 | Ball et al. | 455/404.1 |
| 2009/0063627 A1* | 3/2009 | Nowacek | 709/203 |
| 2010/0167745 A1* | 7/2010 | Madhavan et al. | 455/445 |

FOREIGN PATENT DOCUMENTS

| | | |
|---|---|---|
| WO | WO2007/092463 A2 | 8/2007 |
| WO | WO2008/115142 A1 | 9/2008 |
| WO | WO2009/035698 A1 | 3/2009 |

OTHER PUBLICATIONS http://www.xmradio.com/napster, downloaded May 1, 2009.
http://www.xmradio.com/napster/faq.xmc, downloaded May 1, 2009.
XM Radio—XM2go Music Manager, http://www.xmradio.com/xm2gomusicmanager/index.xmc, downloaded May 1, 2009.
XM on XMp3, http://www.xmradio.com/xmp3/index.html, downloaded May 1, 2009.
Horwitz, J., "The Complete Guide to iTunes Tagging", iLounge Article, http://www.ilounge.com/index.php/articles/comments/the-complete-guide-..., Mar. 13, 2008, downloaded May 1, 2009.
SIRIUS Satellite Radio—My SIRIUS Studio Frequently Asked Questions, http://www.sirius.com/servlet/ContentServer?pagename=Sirius/CachedP..., downloaded May 1, 2009.
"itunes tagging posts—CES 2009—CNET", http://ces.net.com/?keyword=itunes+tagging, downloaded May 1, 2009.
About iTunes Tagging, Apr. 2008, Apple, Inc.
Apple—iTunes—Partner with iTunes—Sales and Marketing, iTunes 8 iTunes Tagging, http://www.apple.com/itunes/itunestagging/, downloaded May 1, 2009.
iTunes® Tagging—iPod dock with HD Radio—Polk Audio I-Sonic ES2, http://www.hdradio.com/iTunes_Tagging/, downloaded May 1, 2009.
I-Sonic Entertainment System with HD Radio from Polk Audio, http://www.polkaudio.com/homeaudio/isonic/?mc_id=hdradio, downloaded May 1, 2009.
"Pioneer inno, XM2go Portable Satellite Radio with MP3, User Guide," Pioneer Electronics Service, Inc., http://www.pioneerelectronics.com, 47 pages, Copyright 2006.
"Samsung Helix, XM2go Satellite Radio with MP3, User Guide," Samsung Electronics America, Inc., www.samsung.com, pp. 1-92, Copyright 2006.
"Samsung NeXus 25 & 50, User Guide," Samsung Electronics America, Inc., http://www.manualslib.com/download/146913/Samsung-Nexus-25.html, 40 pages, Copyright 2006.
"Sirius Sportster SP5, User Guide," Sirius Satellite Radio, Inc., http:/lwww.sirius.ca/library/misc/SP5_Installation_User_Guide_pdf, 124 pages, Copyright 2007.
"Sirius Starmate ST5, Dock and Play Radio, User Guide," Sirius Satellite Radio, Inc., pp. 1-120, http://www.siriusretail.com/pdf/manuals/ST5installation_User_Guide.pdf, Copyright 2008.
"Stiletto 2, Portable Sirius Radio, User Guide," Sirius Satellite Radio, Inc., 54 pages, http://www.siriusretail.com/pdf/manuals/SL2_UserGuide_022508_Hi.pdf, Copyright 2007.
"XM XMP3, User Guide," Pioneer Electronics Service, Inc., pp. 1-78, Copyright 2008.

* cited by examiner

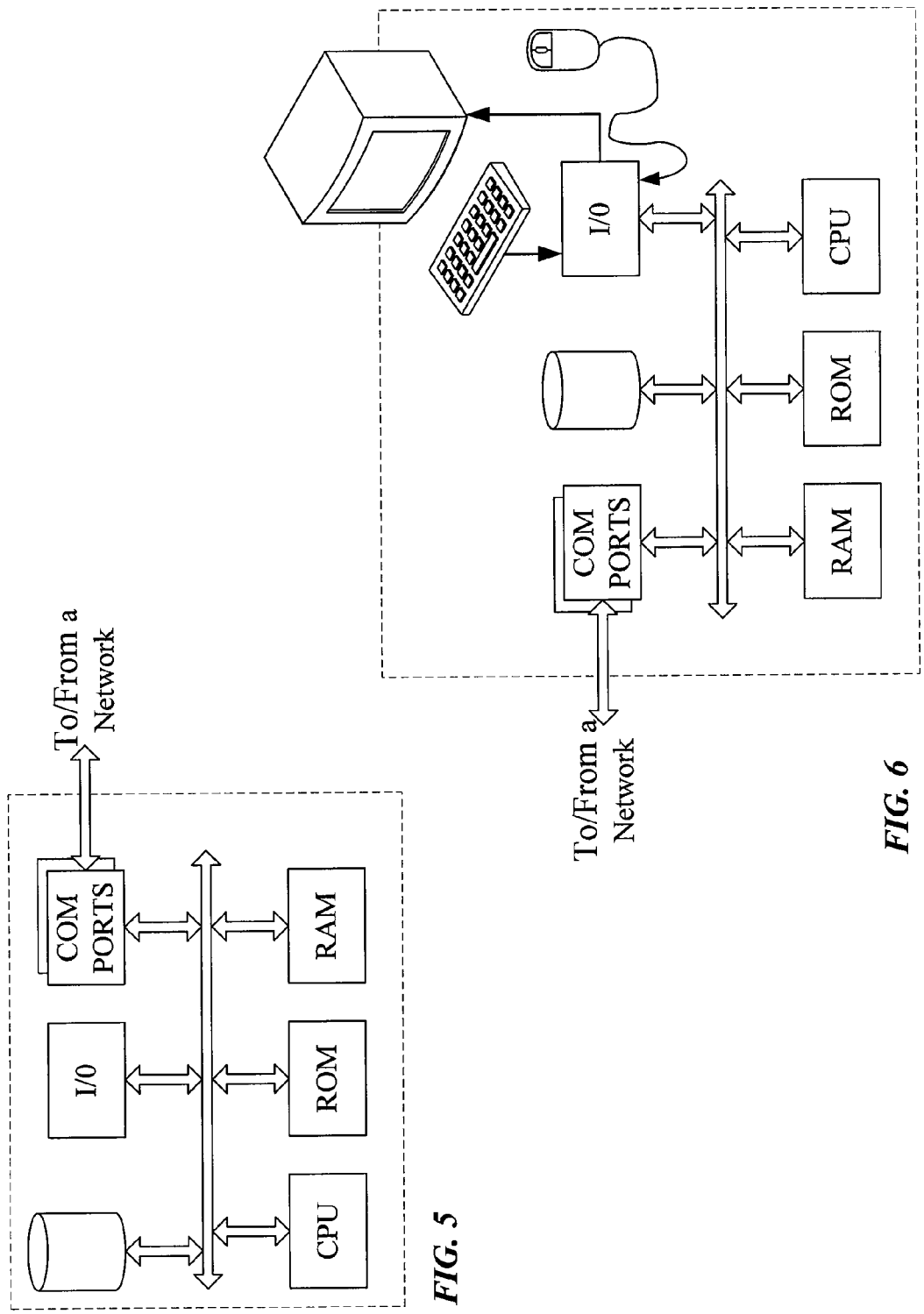

BROADCAST MEDIA INFORMATION CAPTURE AND COMMUNICATION VIA A WIRELESS NETWORK

TECHNICAL FIELD

The present subject matter relates to techniques and equipment for media information capture. In more detail, it relates to techniques and equipment for capturing and communicating information about media broadcast for later review and purchase by a mobile communications network subscriber.

BACKGROUND

Many individuals listen to broadcast music (e.g., FM radio, AM radio, HD Radio, and satellite radio) and watch broadcast television on a daily basis. Often, the broadcasters of the music and television programs include information related to the media being broadcast. Examples include song title, artist information, and television programming information. In addition, information about the broadcaster itself (e.g., the station call letters or channel information in the case of a satellite broadcaster) is typically included. One specific example of a service for providing information about a radio broadcast is the Radio Data System (RDS), which is also referred to as the Radio Broadcast Data System (RBDS). RDS is a communications protocol standard for embedding small amounts of digital information in conventional FM radio broadcasts. The RDS system standardizes several types of information transmitted, including time, station identification and program information.

In some instances, the listener may wish to capture information related to the broadcast in order to later purchase or rent a copy of the song or other media from a media content provider (e.g., iTunes, Zune, Rhapsody, and Napster). One method is to write down the information. In some instances, that isn't possible. Thus some media broadcasters maintain playlists that are accessible via the Internet or other means. This requires the listener to remember what station they were listening to and when they were listening.

Another method of capturing information related to broadcast media is described in US Patent Application Publication No. 2008/0188029. This application describes a personal media device (PMD), such as an iPod or iPhone, and an accessory that cooperate to capture broadcast media information. In some instances, the above application describes an accessory unit that interfaces to or is integral with the PMD. The accessory captures data related to the broadcast media and transfers the captured information to the PMD. In turn, the PMD transmits the captured information to a media content provider to facilitate the purchase of media (e.g., a song) that corresponds to the captured information (e.g. RDS data for the song).

The above-described form of automated capture does suffer from some drawbacks. For example, in order to transfer the data related to the broadcast media to the network it appears that the accessory need to first be connected to the PMD. It is the PMD that then transfers the tags to the content servers. This places a great deal of processing requirements on the PMD and requires that the PMD be available and able to store a large amount of data. Further, this can limit the end user's ability to easily switch among PMD manufactures and content providers.

Thus, a need exists for an PMD manufacture and content provider agnostic media information and interaction system.

SUMMARY

The teachings herein alleviate one or more of the above noted problems with the known methods for capturing, communicating, and processing information related to broadcast media.

Mobile communications network account holders may not prefer to be tied to a particular personal media device (PMD). That is, they may change among various PMD manufactures while still maintaining their account with the wireless provider. For example, at one point in time their PMD maybe manufactured by Samsung. At another time it may be manufactured by Nokia. Account holders would prefer to not have to repurchase media previously purchased just because they changed PMDs. Therefore, centrally storing the lists of the media purchased by the account holder can alleviate some of the problems associated with switching PMDs. Also, by communicating tagged broadcast media from devices other than the PMD updates to the user centrally stored media information are facilitated. For example, if an account holder is listening in a vehicle equipped with a telematics unit that is associated with the account holder interactions with the telematics unit and an associated accessory can facilitate the tagging of broadcast media. The telematics unit and associated accessory can communicate the tag information to a central location on the wireless network for later interaction by the account holder using their associated PMD or other computing means.

In one instance, the present disclosure is directed to a method of creating a list of media of interest to a mobile communication network subscriber. The method includes receiving, over a mobile communications network air interface, a list of one or more tags directly from an accessory device and an identifier of an account of the mobile communications network subscriber and storing the received list of tags. Each tag provides one or more parameters for identification of a broadcast media. The received list of tags is stored at a server in the account associated with the mobile communications network subscriber. The method also includes generating a playlist from the stored list of tags and communicating, from the server to a personal media device, at least a portion of the playlist upon access by the personal media device to the account of the mobile communications network subscriber.

In some instances, the method also includes receiving a purchase request for the broadcast media in the playlist from the personal media device. In some cases, the purchased media is transmitted to the personal media device in response to the purchase request. Also, the method can include receiving the purchased media indicated in the purchase request from a third party content provider for the transmission to the personal media device.

In some instances, receiving over the mobile communications network air interface includes receiving, from a telematics unit associated with a vehicle, the list of one or more tags describing parameters of the broadcast media directly from the accessory device and the identifier of the account of the mobile communications network subscriber. The method can also include communicating the generated playlist to one or more persons other than the mobile communications network subscriber. Also, the method can include communicating the generated playlist to one or more content providers associated with the mobile communications network subscriber.

In yet other instances, receiving over the mobile communications network the list of one more tags includes, receiving a simple messaging service (SMS) message over the mobile communications network air interface with the list of one or more tags directly from an accessory device. Also, communicating from the sever to the personal media device can include communicating the at least a portion of the playlist, from the server to the personal media device via a simple messaging service (SMS) message. In some instances, communicating from the sever to the personal media device includes communicating the at least a portion of the playlist, from the server to the personal media device via a thin client application executing on the personal media device.

In another instance, the present disclosure features a method of creating a list of media of interest to a mobile communication network subscriber. The method includes activating a portion of an accessory unit during a media broadcast, capturing by the accessory unit in response to the activation, a tag of information related to the media broadcast, the tag providing one or more parameters for identification of the media broadcast. The method also includes transmitting to a server for storage, over a mobile communications network air interface, the tag directly from the accessory device and an identifier of an account of a mobile communications network subscriber, initiating a communication session between a personal media device and the server via the mobile communication network, and accessing, by the personal media device, the tag stored at the server.

In some instances, the method includes transmitting, from the personal media device, a purchase request for the media associated with the tag. Further, the method can include receiving the purchased media, by the personal media device, in response to the purchase request.

In some cases, transmitting over the mobile communications network air interface comprises transmitting, from a telematics unit associated with a vehicle directly from the accessory device and the identifier of an account of the mobile communications network subscriber. The tag describes parameters of the broadcast media. The method can also include communicating the tag to one or more persons other than the mobile communications network subscriber.

In some instances, the transmitting over the mobile communications network the tag includes, transmitting via a simple messaging service (SMS) message over the mobile communications network air interface the tag directly from an accessory device. In some cases, accessing includes accessing via a thin client application executing on the personal media device the tag being stored by the server.

In another instances, the present disclosure features an article of manufacture. The article includes a machine readable storage medium and executable program instructions embodied in the machine readable storage medium that when executed by a programmable system in communication with a mobile communications network that when executed causes the system to perform functions that create a list of media of interest to a mobile communication network subscriber.

In some instances, the functions include receiving, over a mobile communications network air interface, a list of one or more tags directly from an accessory device and an identifier of an account of a mobile communications network subscriber, each received tag providing one or more parameters for identification of a media broadcast and storing, at a server in an account associated with the mobile communications network subscriber, the received list of tags. The functions also include generating a playlist from the stored list of tags and communicating, from the server to a personal media device, at least a portion of the playlist upon access by the personal media device to the account holder of the mobile communications network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 is a simplified functional block diagram of a computer that may be configured as a host or server.

FIG. 6 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to system, methods, and articles of manufacture that facilitate the capture of media identification information and interactions involved with communicating that information in a manner to allow a subscriber to use a playlist of one or more content items. For example, functionality is shown and described that leverages wireless communications capabilities of a telematics unit in a vehicle to transfer tags that contain information about broadcast media (e.g., songs and the like) to transfer those tags to a network server of a wireless communication network. Further, a personal media device (PMD) can access the tags or a list compiled from the tags, using a thin client application. The PMD can manipulate the tags to facilitate the purchase of media corresponding to the tags. In a music distribution example, the subscriber via their PMD can purchase a song that was tagged previously while they were operating their vehicle and listening to the vehicle radio.

Figure 1:
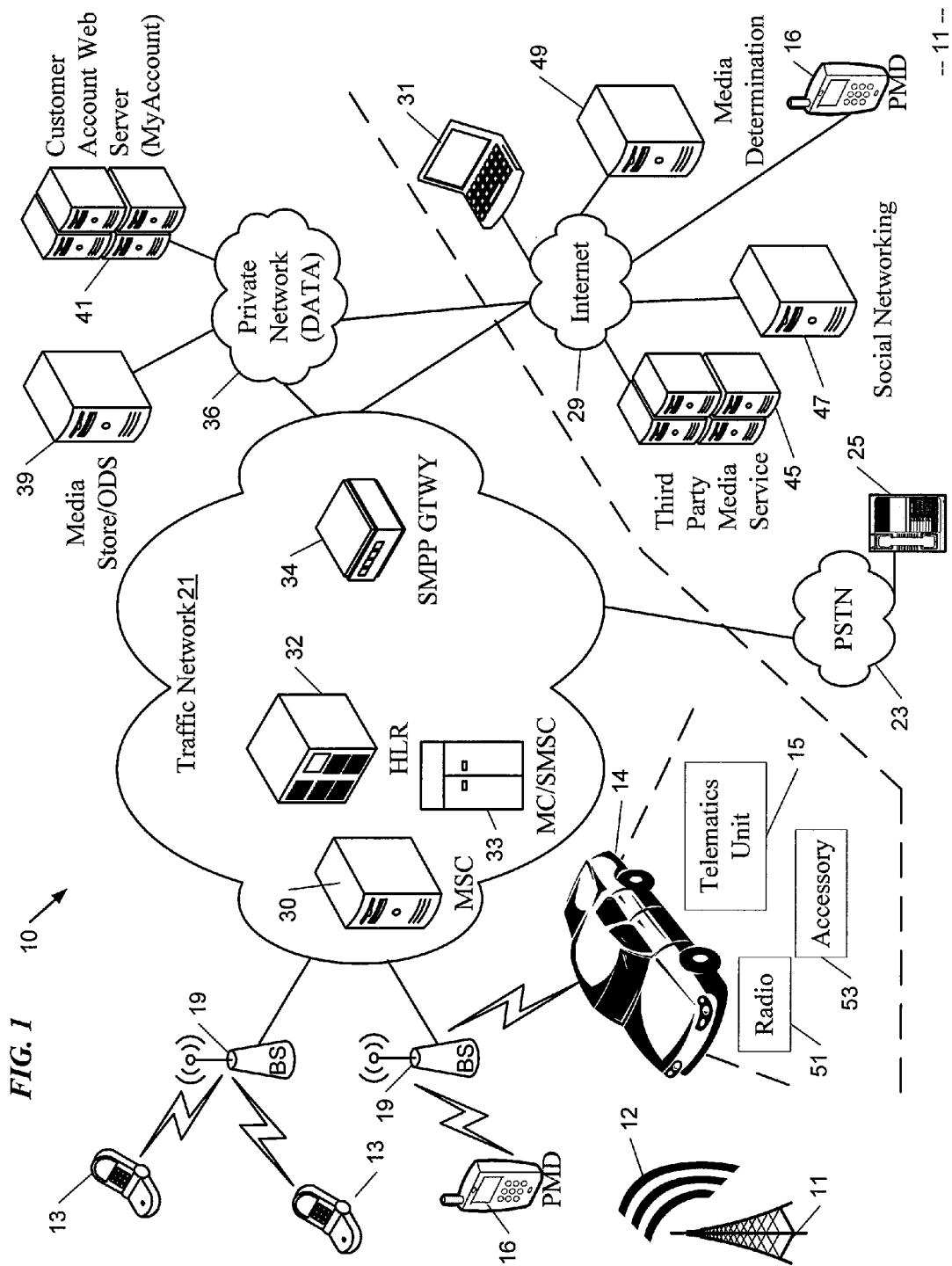
FIG. 1 is a functional block diagram that depicts various components of a mobile network that may be used to implement media broadcast tagging and communication.

Reference now is made in detail to the examples illustrated in the accompanying drawings and discussed below. FIG. 1 illustrates a number of mobile stations, a mobile communication network coupled to other communication networks and several systems/elements associated with or included in the mobile network for various functions as may be involved in the tagging of broadcast media and communication of the tagged information to various components of or through the mobile communications network. In some instances, the communication of the tagging information (i.e., information about the broadcast media) is communicated using the messaging services (e.g., simple messaging service (SMS), enhanced messaging service (EMS), or multimedia messaging service (MMS)) as a transport mechanism. FIG. 1 also includes a broadcast tower 11. The broadcast tower 11 transmits signals 12 that represent broadcast media. Examples of broadcast media include audio works, video works, and various combinations of audio and video works. More specific examples include radio broadcasts and television broadcasts.

These broadcasts 12 can be received by a radio 51 within a vehicle 14. The vehicle can also include an accessory 53 and a telematics unit 15. The radio 51, accessory unit 53, and telematics unit 15 can cooperate to provide the capture and communication of information describing aspects of the broadcast 12. For example, a passenger in the vehicle 14 can activate button one of the radio 51, accessory unit 53, or telematics unit 15 to cause the capture of information about a song playing on the radio. The captured information can include information such as the artist of the song and the title of the song. Further details of this cooperation are described below in more detail.

Before beginning, it is helpful to understand that a Mobile Directory Number (MDN) is the telephone number assigned to a mobile station, which a calling party or device inputs in order to call or send a message to the particular mobile station. To call the mobile station, for example, a user of a PSTN telephone or of another mobile station dials the MDN associated with the mobile station. To send a MMS message, an EMS message, or a SMS message to a destination mobile station, as another example, typically entails input of the MDN of the called mobile station.

A Mobile Identification Number (MIN) is an identification number used by the network to signal a particular mobile station. The MIN is formatted like a telephone number, and the MIN may be the same as the MDN. However, increasingly, the network assigns a different number for use as the MIN and translates the MDN input by a calling or other originating party into the MIN that the network uses to establish the call or send the message to the destination mobile station. Of these numbers assigned to the mobile station, the MDN typically is the number or address of the station known and used by other parties or stations. As described in more detail below, the MDN of the subscriber and one or more MINs (e.g., one for a PMD and one for a telematics unit) can be used to identify the user's account when transferring tags to a network server.

Hence, FIG. 1 illustrates a mobile communication network 10 as may be operated by a carrier or service provider to provide a wide range of mobile communication services and ancillary services or features to its subscriber customers and associated mobile station (MS) users, which are also referred to as subscribers and end-user throughout. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations outside the mobile communication network 10.

For purposes of later discussion, several mobile stations 13 appear in the drawing, to represent examples of the mobile stations that may receive various services via the mobile communication network 10. Today, mobile stations typically take the form portable handsets, laptops with air cards, smartphones or personal digital assistants, although they may be implemented in other form factors. In one example, one or more of the mobile stations can be a personal media device 16 (PMD). When compared to some mobile stations, a PMD includes added functionality. For example, a PMD 16 typically includes the ability to store and play media assets (e.g., music and video). Also, some PMDs 16 include the ability to communicate not only over the mobile communication network but also other types of wireless networks such as 802.11X type networks. In some cases, the PMD 16 can also execute one or more application programs (e.g., a thin client application) that allows the PMD 16 to access one or more application servers of the mobile communications network 10. Examples of PMDs 16 include, but are not limited to personal digital assistants, netbooks, laptops, and certain models of mobile telephones.

In addition, a telematics unit 15 in an associated vehicle 14 can also be a mobile device that communicates with components of the mobile communications network 10. From the view of the network 10, the telematics unit 15 is essentially another mobile station 13. Traditionally, the telematics unit 15 provides emergency and other related services. Examples include crash detection, road side assistance, and navigation related functionality, such as turn-by-turn directions. The telematics unit 15 is provisioned to operate in a manner similar to a mobile station 13, although the network services available to telematics unit maybe limited when compared to those provided to a typical mobile station 13. For example, telematics unit 15 may be provisioned only to send/receive voice and SMS type messaging communications to/from call centers of a telematics service provider or specific elements (e.g., on-demand multimedia services servers) of the network 10. One example of a telematics unit 15 is an On-Star unit. As described in more detail below, the telematics unit can be used to communicate tags or groups of tags from the radio 51 and/or accessory unit 53 to one or more components of the network 10. In some instances, a button on the telematics unit 15 can be activated by a passenger in the vehicle 14 which causes the capture and/or creation of a tag of information related to broadcast media 12.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13 and telematics unit 15, will typically include one or more RANs and a regional circuit and/or packet switched network and associated signaling network facilities.

Physical elements of a RAN operated by one of the mobile service providers or carriers, include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13 and telematics units 15 when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13 between the base stations and other elements with or through which the mobile stations communicate. In some examples, the mobile traffic network includes network elements such as mobile switching centers (MSCs) 30, message centers (MCs) 33, home location registries (HLRs) 32, and other network elements visitor location registers (VLRs) (not shown). Other individual elements such as switches and/or routers forming the traffic network 21 are omitted here form simplicity. Various combinations of the network elements cooperate to provide the various media tagging and tag communication functionality discussed herein. It is understood that the various network elements can communicate with each other and other aspects of the mobile communications network 10 and networks (e.g., PSTN and Internet) either directly or indirectly.

The mobile switching center (MSC) 30 is responsible for managing communications between the mobile station 13 and telematics unit 15 and the other elements of the network 10. In addition, the MSC 30 is responsible for handling voice calls and messaging service message requests as well as other services (such as conference calls, FAX and circuit switched data). The MSC 30 sets up and releases the end-to-end connection, handles mobility and hand-over requirements during the call. The MSC 30 is sometimes referred to as a "switch". The MSC 30 manages the cell sites, the voice trunks, voicemail, and SS7 links.

The message center (MC) 33, in some examples, allows messaging service messages to be exchanged between mobile telephones, telematics units, and other networks. For SMS messaging, for example, the MC 33 receives packet communications containing text messages and forwards the messages via the signaling resources and the signaling channels to the appropriate mobile station. In one example, the MC receives one or more tags or lists of tags from the telematics unit 15 in the form of one or more SMS message. The MC 33 routes the tags to other components of the network 10. For example, the MC can forward the received tags to an account management server as described below in more detail. The MC 33 will also receive similar messages from the mobile devices and forward them to servers or terminal devices accessible via an Internet Protocol (IP) packet data network. For example, the MC 33 may supply an SMS message to a media store, customer account web server or on-demand server (ODS), that is in communication with the Internet and can communicate with devices terminating on the Internet 29.

In some examples, the MC 33 can also be considered or include functionality that may be considered that of a Short Messaging Service Message Center (SMSC) or a Message Register (MR). Wireless carriers developed the short message service (SMS) to transmit text messages for display on the mobile stations. In many existing network architectures, the SMS traffic uses the signaling portion of the network 21 to carry message traffic between a Short Message Service Center (SMSC) 33 and the mobile stations. The SMSC supports mobile station to mobile station delivery of text messages. However, the SMSC also supports communication of messages between the mobile stations and devices coupled to other networks. For example, the SMSC 33 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 34. The SMPP gateway 34 provides protocol conversions, between SMPP as used by the SMSC 33 and the protocols used on the Internet 29 or other IP network. SMPP messages ride on IP transport, e.g. between the gateway 34 and the SMSC 33.

Although a single MC 33 is shown, a network 10 will often have many geographically dispersed MCs 33. The MCs 33 can include destination routing tables (DRTs). In essence the DRTs are databases within the MCs 33. A DRT contains a list of the MDNs which are associated with the various MCs 33. For example, a first MDN is associated with a MC 33 in Minnesota while a second MDN is associated with a MC 33 in Virginia. The DRTs are used to determine which MC 33 should attempt to deliver an incoming messaging service message to the destination MDN. For example, if a user associated with the MC in Minnesota sends an SMS to a user associated with the MC 33 in Virginia, the Minnesota MC 33 sends the SMS message to the Virginia MC 33 for delivery to the mobile station or other device having the destination MDN. The communication among the MCs 33 occurs using known protocols such SMPP and the like.

The HLR 32, in some examples, stores a subscriber profile for each of the wireless subscribers and their associated mobile stations 13, as well as for the PMDs 16 and the telematics units 15 (which are referred to collectively as mobile devices herein). The HLR 32 may reside in an MSC 30 or in a centralized service control point that communicates with the MSC(s) 30 via an out-of-band signaling system such as an SS7 network. The HLR 32 stores for each mobile subscriber the subscriber's mobile directory number (MDN), the mobile identification number (MIN), and information specifying the wireless services subscribed to by the mobile subscriber, such as numeric paging or text-based paging, data communication services, etc. In a situation where a subscriber has configured the ability to publish a received list of tags, the HLR can store information related to where to publish the tags such a social networking site. Of course, the HLR 32 can also be a stand-alone device. The HLR also tracks the current point of attachment of the mobile devices to the network, e.g., the identification of the MSC 30 with which the mobile device is currently registered to receive service.

The visitor location register (VLR) (not shown) is, in some examples, a temporary database of the mobile devices that have roamed into the particular area which it serves. The VLRs for a region often are implemented in or in association with a MSC 30. Each base station 19 in the network is served by a single VLR, hence a subscriber cannot be present in more than one VLR at a time. The data stored in the VLR has either been received from the HLR 32, or collected from the mobile device.

The SMPP gateway 34 provides functionality to transport messaging service messages to other mobile communication networks and also receive messaging service messages from other networks. The SMPP gateway 34 supports communications using the SMPP protocol. SMPP gateways 34 are Short Message Peer-to-Peer (SMPP) gateways 34 used to connect the wireless communication network (such as an Internal Protocol IP network on the left of the Gateway) to another network (such as a public Internet network on the right of the Gateway). The SMPP Gateway 34 allows the MC 33 to receive and send messages in IP packet format. The SMPP Gateway 34 is an entity within the wireless network 10 that acts as an intermediary between the wireless service provider network and other networks. For example, the SMPP Gateway 34 converts messages in protocol(s) used by other applications and devices, e.g. Extensible Markup Language (XML), Hypertext Mail Protocol (HTMP), etc., to and from the SMPP protocol. The SMPP messages ride on IP transport, e.g. between the SMPP Gateway 34 and the MC 33. As such, the SMPP gateway can convert, as needed, tags received as SMS messages into other formats for forwarding to other components. For example, the SMPP gateway 34 can forward the received tags to a social network site such as Facebook or Myspace. Also, the SMPP gateway 34 can forward the received tags to an account web server, a media store, a media determination server, or some other device.

The network 10 may implement wireless communications with the mobile stations 13 (and similar mobile telematics unit 15) via any of a variety of different standard communication technologies common in public wireless mobile communication networks. Examples of such technologies include various CDMA standards, including 3GPP2 variants thereof (e.g. 1XRTT or EV-DO), as well as TDMA and GSM standards including 3GPP variants (e.g. LTE or UMTS). The mobile stations 13 and the communications elements of the telematics unit 15 would be configured to communicate in accord with the wireless standard supported by the network 10, although many such mobile devices have the capability of communicating via a number of networks that may utilize different standardized technologies (multi-mode devices).

The traffic network portion 21 of the mobile communication network 10 connects to the public switched telephone network (PSTN) 23. This allows the network 10 to provide voice grade call connections between mobile stations and regular telephones connected to the PSTN 23. The drawing shows one such telephone at 25.

In addition, the traffic network portion 21 of the mobile communications network 10 connects to a private data network 36. The private data network 36 connects to the traffic network portion 21 via an SMPP Gateway 34 in some cases. The SMPP Gateway 34 provides protocol conversions between SMPP as used by the SMSC 33 and the protocols used by the private data network 36.

In communication with the private data network can be various auxiliary services servers that provide additional services to the users of the network 10. For example, various media stores/on-demand servers (ODS) 39 and Customer Account Web Servers 41 are provided in some configurations of the network 10.

The media store/ODS 39 provides access to various media. This media can be rented, purchased, or provided on-demand to one or more PMDs 13 at the request of the account holders having the appropriate service subscriptions. The media store/ODS 39 allows the users access via PCs 31 (or PMDs 13) to a search catalog in the media store server, and purchase and request to download music, or the like. The media store platform provides users with various functionalities required for purchasing and downloading multimedia contents including music, video or the like. The exemplary media functionalities include menus such as "ARTISTS," "GENRE," "TOP HIT," of which selection allows the users to look up grouped lists of music based on artists, genre, and top hit music by users, and menu "SEARCH," selection of which permits the users to search their desired music in catalog of the media server 39. For purposes of an example, assume that the catalog relates to music, although other general types of content such as movies or TV programs could be offered instead or in addition to the 'music' related store content.

The media store/ODS 39 can display a search result in the catalog based on an exemplary search term "Beautiful," which is inputted via selection of the menu "SEARCH" by the user. The search result displays description of music related content including term "Beautiful," i.e. "Beautiful," "Beautiful Sunday," and "Beautiful Woman." The music identified by "Beautiful" includes diverse versions of the music entitled, "BEAUTIFUL" performed by different artists "A, B," and collected in different albums/collections "Various, Suspicious and Best Hit." The search result can also include Ringtone, Ringback Tone and Music On Demand (MOD) types, versions of the song "Beautiful." The listed versions of the music "Beautiful," "Beautiful Sunday," and "Beautiful Woman" can be obtained from plural music vendors databases or at the store service provider's database. The media store/ODS 39 may be provided at a wireless communication service provider's website in the HTML form appropriate for accessing via personal computers or laptops and may also be provided at hand-held wireless communication devices in the application interface tailored to PMD 16.

Since the media store/ODS 39 provides a catalog, which categorizes diverse versions of the music according to genre (menu "GENRE"), artists (menu "ARTISTS"), and diverse categories, the users can conveniently find and download a specific desired version of his or her desired music via the multimedia store. To categorize music according to genre, artists or the like and to provide search function in the media store platform, the wireless communication service provider has to find and match diverse versions of textual information referencing, indexing or otherwise describing the music from vendors' catalogs, in this example, based on textual information including artists, albums and titles in the vendors' catalogs. The catalog of music can be searched using the tag information provided from the telematics unit to locate tracks of interest to the account holder of the PMD 16 and provide them to the PMD 16 upon request from the account holder.

In one 'music' type store example, the wireless communication service provider's media store/ODS 39 may not store actual music, however, the wireless communication service provider (or the media store platform provider) needs to pull together and group descriptive texts (album, track and collection names) of music obtainable from one or more third party media services 45 and enable the music from the third party media services 45 to be purchasable on the media store/ODS 39. As part of the process, revenue generated from the purchase or rental of the song can be shared among the network carrier and the operator of the third party media service 45.

The Customer Account Web Server (MyAccount) 41, provides network subscribers on-line access to a variety of functions related to the subscribers' accounts, such as review of billing statements and usage data, on-line payment, subscription changes, password control or the like via the Internet 29 and private network 36. Hence, a user's terminal, such as PC 31, may be used to access on-line information about a subscriber's account, which the mobile carrier makes available via the carrier's MyAccount web site accessible through the Internet 29. The various tags communicated from the telematics unit 15 can be stored/associated with the a users account for access via the customer account web server 41. In addition, various playlists created by the user can be stored/associated for access via the customer account web server 41. The tags communicated from the telematics unit 15 can be added to a playlist or create a new playlist. Upon access by the PMD 16 or PC 31 to the user's account, the playlists and tagged information can be manipulated. For example, the user can log into their account and indicate a desire to purchase a tagged song. Also, the user can arrange the tagged songs into existing playlists or create new playlists. When the PMD 16 connects to the private network 36 via either the network 10 or the Internet 29, media information stored on the PMD 16 can be synchronized, updated, or removed according to the manipulations of the user's account on the customer account web server 41. Depending on the information contained in the tags, the customer account web server 41 may communicate with additional third party servers, as described in more detail below, to determine the artist of tagged media, publish tag information, or provide the ability to purchase or rent the tagged media. It should be understood that some or all of the above-described functionality can be implemented on another server of the network 10.

Also, the traffic network portion 21 of the mobile communication network 10 connects to a public packet switched data communication network, such as the network commonly referred to as the "Internet" shown at 29. In some configurations, the SMPP Gateway 34 between the traffic network portion 21 of the network 10 and the Internet 29. Packet switched communications via the traffic network 21 and the Internet 29 may support a variety of user services through the network 10, such as mobile device communications of text and multimedia messages, e-mail, web surfing or browsing, programming and media downloading, etc. For example, one ore more third party media services 45 (e.g., Napster, Rhapsody, iTunes, etc.) can provide access to media associated with tagged broadcast media. Also, some of the tagged information can be provide to various social networking sites 47 such as MySpace and Facebook. For example, tag information or lists derived from tag information related to the tagged media can be posted on these sites for sharing with the end user's online community. In some cases, the tagged information may include a portion of the broadcast media among other data. A third party media determination server 49 can be used to determine further information about the tagged information. In one example, a portion of a song is included in the tag. That portion is sent to a media determination server 49 to determine the artists and name of the song, which can be used to provide the account holder with the ability to purchase the song.

With that overview of various components of the system and network 10, it may be helpful now to consider a high-level discussion of an example of how a subscriber of a wireless communication network can tag broadcast media and communicate those tags to the various component so the network 10 and/or Internet 29. Assume the end user is driving in their vehicle 14 when a new song comes on the radio. The end user wants to purchase or rent that song at a later time. Instead of having to remember the details about the song (e.g., the artist, the name of the song, what station they heard it one, etc.), the end user activates a button on an accessory unit that is integral with or in communication with a radio in the car and the telematics unit 15 of the car.

Upon activation of the button, tag information about the song is stored in the accessory unit or telematics unit 15. After storage, in either real-time, periodically, or upon the end user's request, the stored tag(s) are transmitted via the network 10 (e.g., using SMS messaging) to the customer account web server 41. Once received, the customer account web server 41 can communicate, directly or indirectly, with the media store/ODS 39 and other third party services (e.g., third party media service 45, social network service 47, and media determination server 49). These services can aid in providing the end user access to the tagged media. For example when the end user accesses their account via their PMD 16 using a thin client or other technique, the tagged media can be purchased or rented and transferred to the PMD 16. Also, the end user can access the tag information via a PC 31 to manipulate a list of tags and other media preferences of their account.

Figure 2:
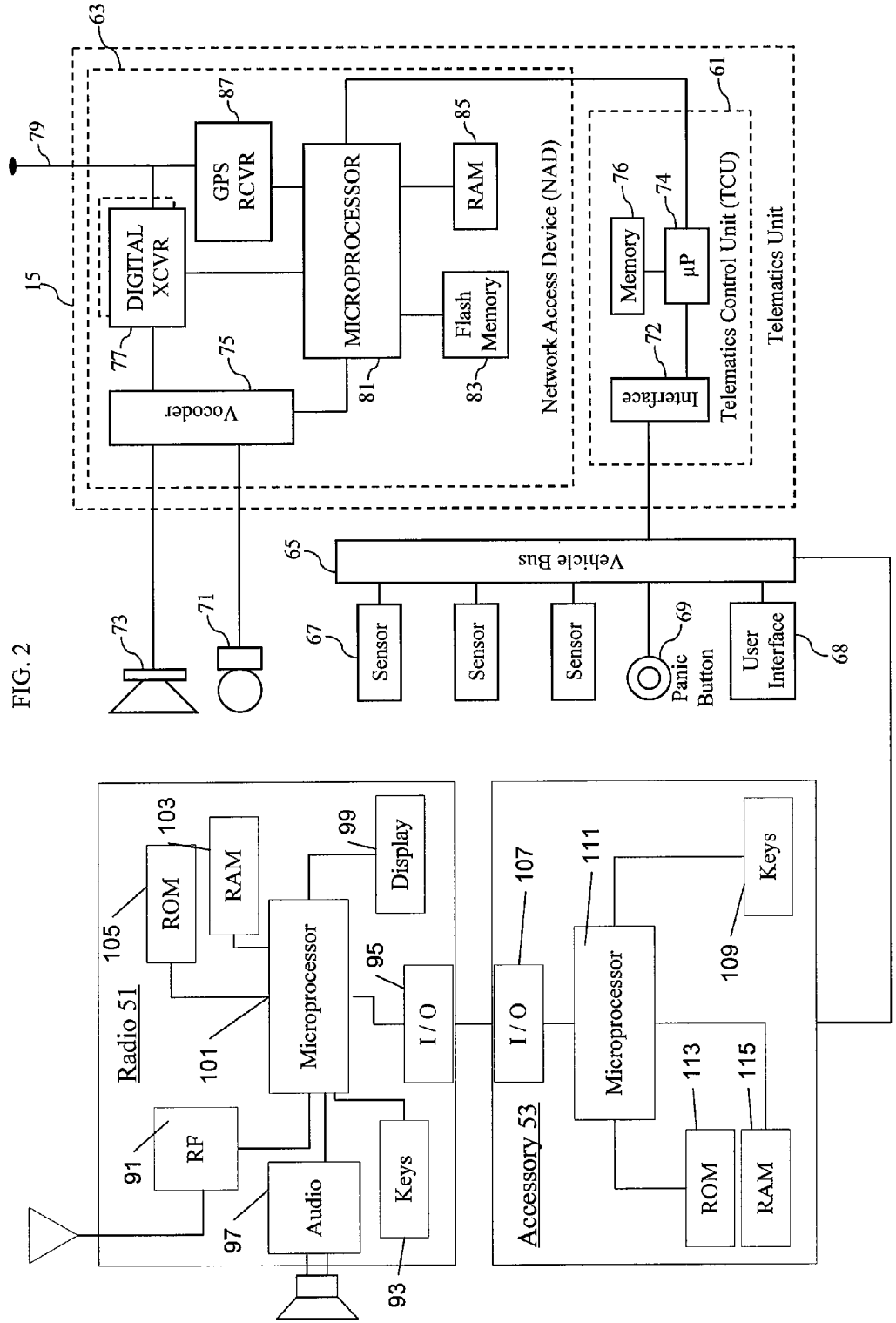
FIG. 2 is a functional block diagram useful in understanding the interaction among a radio receiver, an accessory device, and telematics unit in one exemplary configuration.

With reference to FIG. 2, details of a telematics unit 15, radio 51, and accessory unit 53 as may be used in a vehicle 14 are shown and described. The telematics unit 15 includes a telematics control unit (TCU) 61 and a wireless Network Access Device (NAD) 63. The TCU 61 may be implemented as a microprocessor (μP) with one or more memories, interfaces, and programming to implement the emergency monitoring and notification functions. Programming in the memory of the TCU 61, for example, enables the TCU microprocessor to process the signals received via a vehicle interface to detect occurrence of the emergency condition, and in response to detecting the occurrence of the emergency condition to instruct the NAD 63 to initiate an emergency call.

A vehicle 14 typically includes a vehicle bus, shown at 65 in FIG. 2, for providing digital data communications among various on-board devices/systems, particularly for vehicle diagnostics purposes. For crash detection, the vehicle 14 includes one or more sensors 67 for detecting conditions that may relate to a crash, and the vehicle bus 65 provides the continuous electrical connection within the vehicle 14 for the communication of diagnostics data from the sensors 67 to the TCU 61. The TCU 61 is programmed to process data received from the sensors 67 to determine if there has been a crash and to generate data regarding the detected crash, e.g. to indicate severity. The vehicle 14 may also include a panic button 69, coupled to communicate with the TCU 61 via the vehicle bus 65. A vehicle 14 occupant would activate the panic button 69 in the event of a condition that the occupant perceives as an emergency. The TCU 61 determines that there has been an emergency event warranting an automatic report to the TSP call center, in response to crash detection from the processing of the data from the sensor(s) 67 or in response to activation of the panic button 69. In response to any determination of an emergency, the TCU 61 activates the NAD 63 to initiate the communication with the network 10. The NAD 63 acts as the communications tool for entry to the wide area wireless network via cellular communications.

The NAD 63 is a wireless transceiver unit configured for communications via the wireless communication facilities of the mobile network 10 of FIG. 1. The NAD 63 is generally similar to a wireless mobile station 13 configured for voice and data communications. It is assumed that those skilled in the art are familiar with the structure and operation of mobile devices and thus with the structure and operation of generally similar devices that may be used to implement the NAD 63. To insure a full understanding by all readers, however, it may be helpful to consider a high level summary review of the relevant structure of one example of a NAD 63.

The NAD 63 supports both data communication and voice communication. For the voice communication function, the vehicle 14 will include a microphone 71 for audio signal input and a speaker 73 for audio signal output. The microphone 71 and the speaker 73 connect to voice coding and decoding circuitry (vocoder) 75 within the NAD 61. During a voice telephone type communication with the network 10, for example, the vocoder 75 provides two-way conversion between analog audio signals representing speech or other audio and digital samples at a compressed bit rate compatible with the digital protocol of the wireless network communications.

For digital wireless communications, the NAD 63 also includes a digital transceiver (XCVR) 77. The concepts discussed here encompass embodiments of the NAD 63 utilizing any digital transceivers that conform to current or future developed digital wireless communication standards. For example, the transceiver 77 could be an EV-DO, TDMA or GSM unit designed for cellular or personal communications services (PCS) operation. As discussed more, later, such transceivers also support SMS message communications, in this case, for transmitting tags and related information to the communication network 10.

The transceiver 77 provides two-way wireless communication of information, such as vocoded speech samples and digital message information. The transceiver 77 also sends and receives a variety of signaling messages in support of the various communications provided via the NAD 63 and the various wireless network facilities. These signaling messages, for example, also enable SMS communications. The transceiver 77 connects through RF send and receive amplifiers (not separately shown) to an antenna 79. The NAD 63 may include one or more additional transceivers, as shown in dotted line form, for operation in an analog mode or in accord with an alternative digital standard, such as EV-DO.

A microprocessor 81 acts as a controller for controlling all operations of the NAD 63. The microprocessor 81 is a programmable controller. The NAD 63 also includes flash type program memory 83 and/or a non-volatile random access memory (RAM) 85, for storing various software routines and mobile configuration settings, for use by the microprocessor 81.

For position determination, the NAD 63 also includes a global position system (GPS) receiver 87. Under control of the microprocessor 81, the GPS receiver 87 receives and processes signals from one or more satellites of the GPS constellation of GPS satellites. From its processing, the GPS receiver 87 supplies GPS data to the microprocessor 81, such as pseudorange measurements and associated pseudorandom number (PN) codes for measured satellite signals. Associated computations may be performed in the microprocessor or by a processor or the like included in the GPS receiver, or the data may be forwarded to other network or third party components center for processing to obtain a final fix (latitude and longitude coordinates) as to the location of the vehicle 14. This location information can be used by, for example, media determination server 49 to determine station information related to the tagged broadcast media when RDS data is not available. For example, the latitude and longitude of the vehicle 14 when the broadcast is tagged can be used to determine which stations the tagged broadcast originated from. By limiting the number of potential stations, the media determination server 39 can reduce the number of station playlists it checks when determining information about the tagged broadcast media.

The radio 51 can include various components such as an RF component 91 for receiving the broadcast signals, keys 93 for receiving user input, an I/O interface 95 for communicating with other elements such as the accessory unit 53. The radio also includes an audio output component 97 that provides the audio output within the vehicle 14. The radio also includes a display 99 for provides information related to the media being listened too. This information can also be captured as part of the tag information about the broadcast media. In some cases, the radio 51 also includes a microprocessor 101, RAM 103 and ROM 105, of course other types of memory can also be used. The microprocessor 101 can process the RDS data or other broadcast information related to the song and present it on the display 99. In addition, about receipt of a signal from the accessory the microprocessor 101 can capture information about the song being received and create a tag for that song. The tag information can include, but is not limited to, the name of the song, the artists of the song, the station the song is playing on, the start time and date of the song, the end time and date of the song, a portion of the song, or any other data that can be used to identify the song. In some examples, the tag information is Radio Data System (RDS) data. Of course, various combinations of information can be used to create a tag. One or more of the tags can be stored in the RAM 103 of the radio 53 for later retrieval by the accessory unit. Also, the tags can be communicated via I/O interface 95 to the accessory unit upon generation.

The accessory unit 53 communicates, in some cases, with the radio 51. The accessory unit also communicates with the telematics unit 15, for example via the vehicle bus 65. Although shown as separate units, in one example, the radio 51 and accessory unit 53 are integral with one another. In another example, the accessory unit 53 is integral with the telematics unit 15.

The accessory unit 53 includes an I/O interface 107, one or more keys 109, a microprocessor 111, read-only memory (ROM) 113, and random access memory (RAM) 115. The various components of the accessory unit cooperate to generate tags related to broadcast media. For example, the keys 109 can be used to signal the microprocessor 111 that is executing a program stored in ROM 113 or RAM 115 to capture information related to a song playing on the radio 51. In response to depressing a key 109, the microprocessor 111 can generate a tag from RDS information included in the broadcast. The RDS information can be retrieved from the radio 51 via I/O interface 107.

The generated tag can be stored in the RAM 115 of the accessory unit 53. Over time, a number of tags can be stored in the RAM 115 of the accessory unit 53. The plurality of tags can be grouped into one or more playlists. The playlists can be generated based on temporal aspects (e.g., date and time), geographical (e.g., latitude and longitude), or broadcaster aspects. Playlists can include multiple tags or a single tag.

In situations where RDS or other data is not available for tag generation, the accessory can store a portion of the broadcast along with GPS location information received from the telematics unit 15 as a portion of the tag. Also, temporal information (e.g., date and time) information can be included. Again, the record portion of the song and additional information can be used by the media determination server 49 to determine the actual artist of the song.

Transfer for the stored tag from the accessory to the network 10 can be accomplished in a number of ways. In one example, the user activates one of the keys 109 of the accessory unit 53. In another example, the accessory unit 53 automatically transfers the stored tags periodically or after the occurrence of an event (e.g., the starting or shutting off of the vehicle 14). In another example, each time a tag is created it is transferred upon creation. As mentioned above, the tags can be grouped in playlists. Thus, playlists can also be transferred in whole or in part.

In some instances, the stored tags are transferred from the accessory unit 53 to the telematics unit 15 via the I/O interface 107 and vehicle bus 65. Once received at the telematics units 15, the tags can be stored or transferred to the network 10. In one example, the tags are transmitted via SMS from the telematics unit 15 to the network 10. Of course, other protocols can be used. For example, the tags can be transferred using IP protocols depending on the type of network 10.

In the case of an SMS transfer it may be helpful to understand how a typical SMS message is sent. An SMS message includes source and destination address fields. For messages from a mobile device, the source address is the MDN of the sending customer's mobile station or telematics unit. The MDN in the source field can be used to identify the account of the subscriber on the customer account web server 41. The destination address may be a MDN of a destination station or some other form of recognizable address. One type of alternative address is a short code A short code for SMS is a digit string that is not as long as a telephone number which is typically 7 digits or 10 digits, For example, a short code typically is four, five, six, eight, or twelve digits. In one example, the Customer Account Web Server 41 may be assigned a short code. Hence, the network 10 routes outgoing messages from a mobile station 13, from a PMD 16, or from a telematics unit 15 using a short code for content tagging service to the actual address of the Customer Account Web Server 41.

The SMSC 33 communicates with external customer equipment, typically computers hosting the third party applications such as those on servers 45, 47, and 49, via an IP network, in this case the network 36 and the Internet 29. To provide the interface for such communications, the network 10 includes the SMPP gateway (GW) server 34. The SMPP gateway 34 communicates with the SMSC 33 via an internal IP link or network (not separately shown), and the gateway 34 communicates with the private data network 34 (and/or the public Internet 29). The gateway 34 allows the SMSC 33 to receive and send messages in IP packet format. The SMPP gateway 34 is the entity within the wireless mobile communication network 10 that acts as an intermediary between the wireless service provider network 10 and the external application server community. For example, the gateway server 31 converts messages in protocol(s) used by the third party applications one the servers 45, 47, and 49, e.g. Extensible Markup Language (XML), Hypertext Mail Protocol (HTMP), etc., to and from the SMPP protocol used for SMS services through the network 10. The SMPP messages ride on IP transport, e.g. between the gateway 34 and the SMSC 33.

As noted, each SMS message includes source and destination address fields. Typically, each address is either an MDN of a mobile station or a short code of an application service. The network routes a SMS message with a MDN destination address all the way through to the addressed mobile station 13 (or similarly to a telematics units 15). The network routes a SMS message with a short code destination address to a service provider application corresponding to the short code. Depending on the service, the application may process the message to determine who the artist of the tagged broadcast media was, publish a list of tags on a social networking site 47, or in the multimedia content processing service, provide access to tagged media if not already present in the media store 39.

SMS routing thus allows use of short codes as a mechanism to route messages to/from an application service provider, as opposed to communication of messages between end user devices. For this purpose, the short code is recognized by a control application as being a message to a service provider as opposed to a message between SMS user devices, and the control application translates the short code to direct the message to the appropriate service provider platform.

For an outgoing SMS message from a telematics unit 15, the message includes a source address comprising a field for the normal telephone number of the originating device and a field for another device identifier assigned by the network operator. In a typical SMS communication from a mobile station 13, the telephone number is the MDN whereas the other identifier is a MIN or an International Mobile Subscriber Identity (IMSI).

For SMS messages originating at a telematics unit 15, a node of the traffic network 10 such as the mobile switching center 30 determines where to route the message. For a telematics unit 15 originated message containing a telephone number of a destination (e.g. an MDN of another mobile station), the control node typically routes the message to one of several SMSCs 29 deployed in the network 10, based on the MIN of the sending device. Essentially, the control node looks up the point code or other form of address for the appropriate SMSC 33 based on the MIN of the sending mobile station 13 contained in the source field of the received SMS message. The SMSC 33 then determines how to deliver the message based on the destination address of the message, e.g. a directory number of another mobile station or a short code for the customer account web server 41.

Short code routing could utilize a similar procedure to route messages to an SMSC 33, which determines proper handling. However, as such messages typically are directed to another server (of the application service provider), the network 10 can be configured to bypass the SMSC 33 for some or all mobile originated short code traffic. For traffic/load management reasons, a particular gateway 34 may be provisioned to handle the relevant traffic, e.g. for all mobile originated traffic addressed to any/all short codes or for mobile originated traffic addressed to a particular short code or set of short codes. The gateway 34 routes SMS messages addressed short codes to an application server (e.g., the customer account web server 41) to which the particular short code has been assigned.

As discussed above, the destination address of a SMS message usually contains a directory number or other full address of the destination, or the destination address field contains a predefined short code. In a normal operation for a SMS transmission to a mobile station 13, an SMSC 33 receives the message containing the MDN of the destination station 13 and queries the particular HLR 32 that stores the record associated with that station's MDN for information about the mobile station 13 that is needed to route the message to the mobile station at its current location. The home location register responds by providing the current routing information, and the SMSC 33 uses that information to send the message through the network 10 and the serving base station 19 for delivery to the destination mobile station 13.

Also, the communications to/from customer account web server 41 could be initiated by any of several different elements of the network 10. For example, an SMSC 33 could receive the relevant messages and send them to the customer account web server 41 for the necessary short code processing functions. Further details of SMS routing to application servers from a telematics unit 13 are omitted for simplicities sake as they are understood by those of ordinary skill in the art.

Figure 3:
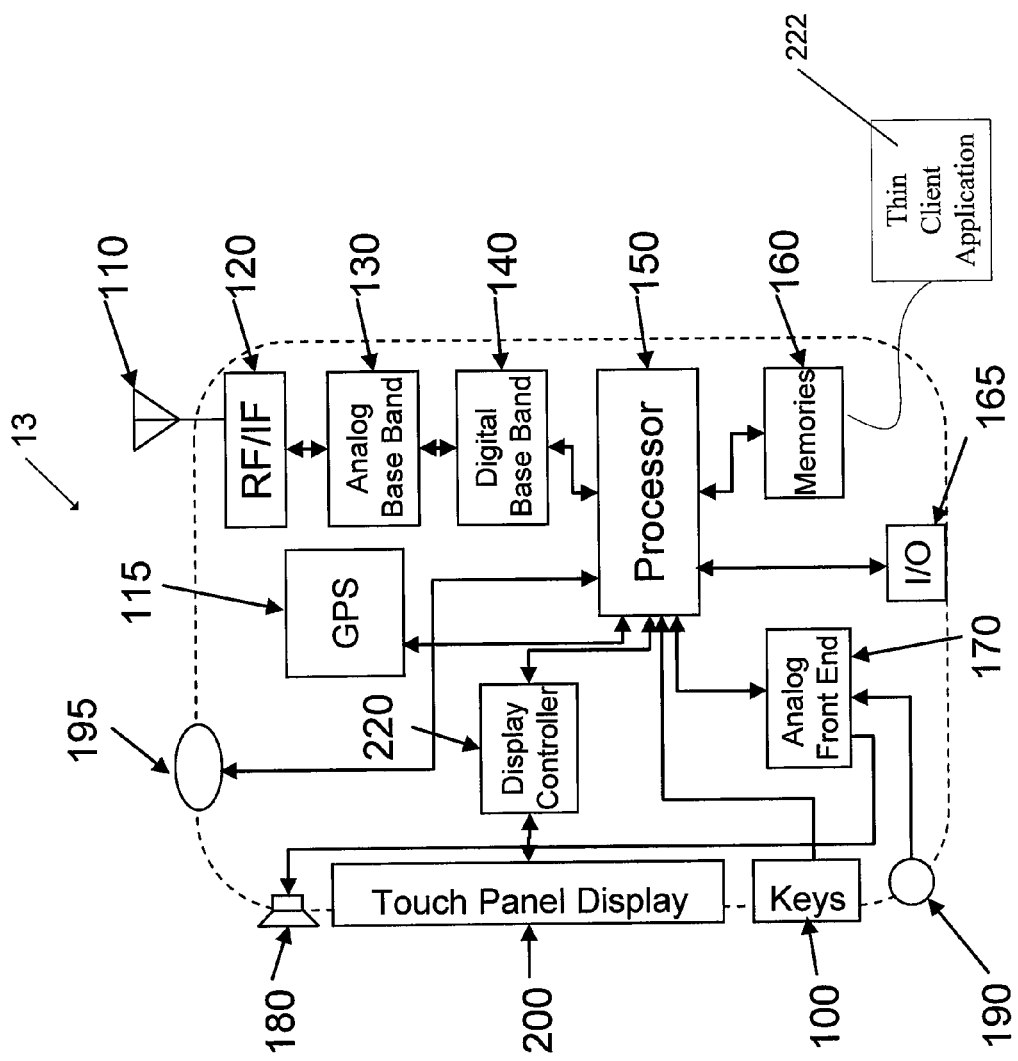
FIG. 3 is a simplified block diagram of an exemplary personal media device.

With reference to FIG. 3, an exemplary PMD 16 is shown and described. In this example, the PMD 16 has a touch panel display. The PMD 16 includes keys 100, an RF interface 120 connected to an antenna 110, an analog base band processor 130 and a digital base band processor 140 connected to a processor 150. A display controller or driver 220 is connected to a touch panel display 200 and the processor 150, for controlling the touch panel display 200. An analog front end processor 170 is connected to the processor 150 and controls a speaker 180 and a microphone 190. The processor 150 controls the display controller 220, RF circuits (120, 130 and 140) and the analog front end processor 170. The processor 150 also connects to one or more memories 160. The memories 160 may comprise a RAM, a ROM or a flash memory, a hard drive, a solid state hard drive, and may include a removable memory card. Various applications such as a client application 222 can be stored in the memories and executed by the processor 150. The PMD 16 may include a camera (still and/or video) 195 to take a picture or a video. The PMD 16 may further include a GPS receiver 115 for use in locating the position of the PMD 16. The PMD 16 may further include an input/output (I/O) terminal 165. The I/O port may be a USB port.

In this example, the touch panel display 200 is controlled by the display controller 220, i.e., circuitry. The display controller may detect and respond to the touching of the touch panel display by the user. However, the display controller may be included in the touch panel display 200 or in the processor 150, and may be any circuitries configured to control outputs on and respond to touching of the touch panel display 200. The display controller 220 may also be controlled by the processor 150 and/or software. In the embodiment, the touch panel display 200 is configured to be controlled by, e.g. the display controller 220 and the display controller 220 is configured to be controlled by, e.g. the processor 150.

The configuration of these elements is not limited to that shown. For example, the PMD 16 can include circuitry to access other wireless networks such as an 802.11X type network. Details of this circuitry are omitted for simplicity because they are known to those of ordinary skill in the art.

In some instance, the thin client application 222 causes the PMD to access the subscriber's account on the customer account web server 41. The thin client application 222 facilitates interaction with the customer account web server 41 to manipulate the tags received from the telematics unit 15. For example, upon access the subscriber can indicate whether they wish to purchase one or more songs that correspond to the tagged media, rent (via ODS server 39) one or more of the songs, publish the list of tags to a social network server 47, and other manipulations. Other examples, include deleting one or more of the tags and reorganizing the tags into one or more playlists. Assuming one or more songs are selected for purchase or rental, those songs are transferred to the PMD 16 and stored in one the memories 160.

Although shown as a mobile handset in FIG. 3, the PMD 16 can also take other forms. For example, the PMD 16 can be a netbook type computing device, a personal computer (e.g., a laptop), a personal digital assistant (PDA) or other computing device that is capable of network communications and media playback. The PMD 16 should be able to access the server on the network 10 storing the tags. In some cases, this can occur via a thin client application like that shown with respect to the PMD 16. In another case, the server that stores the tags can be accessed via a web interface such as that described with respect to the customer account web server 41.

Figure 4:
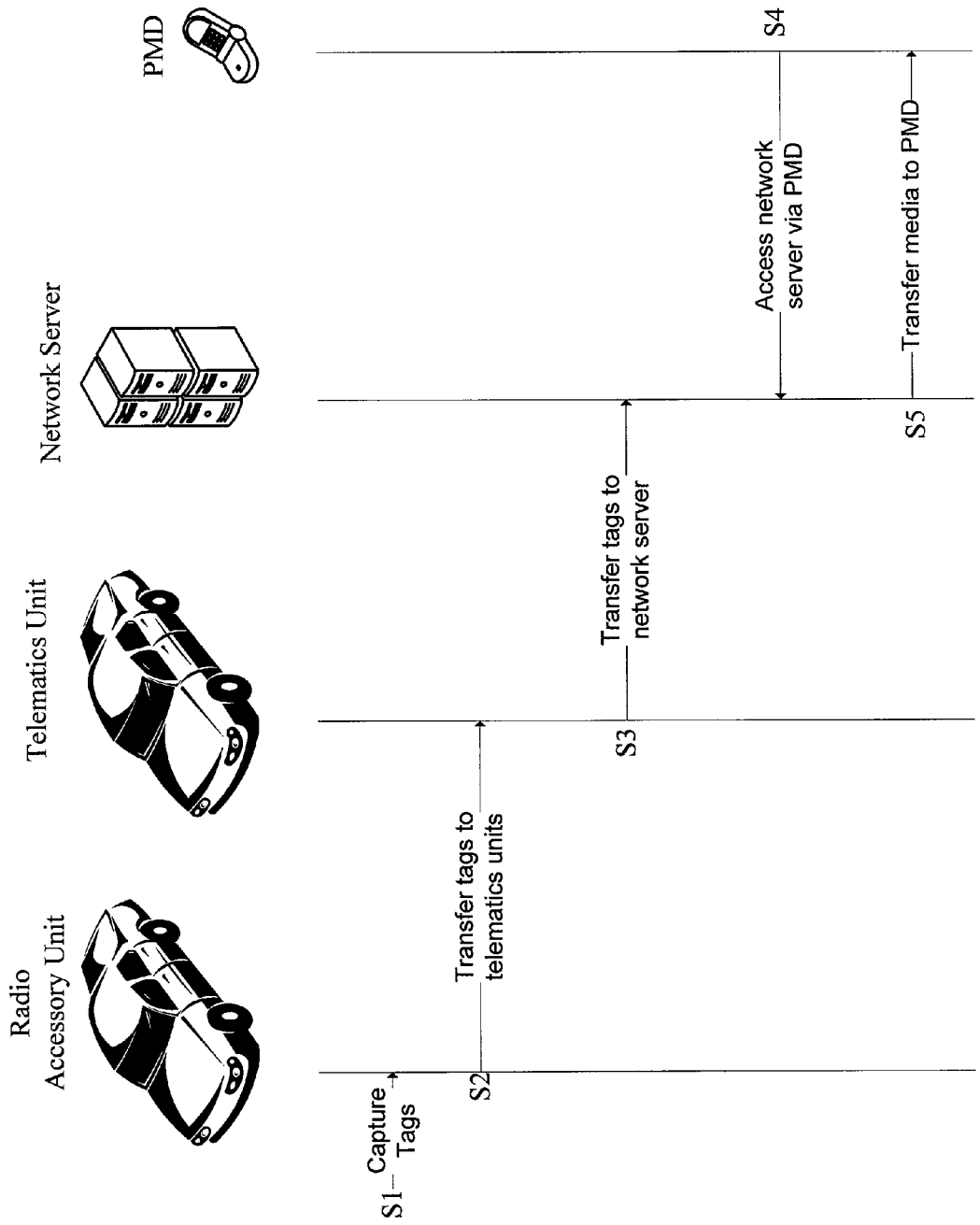
FIG. 4 is a simplified example of a method of media information capture and interaction.

With reference to FIG. 4, a simplified example of a method of broadcast media information capture and interaction is shown and described. In step S1, information related to broadcast media (e.g., songs) is captured and tags are created. In one example, the radio 51 of a vehicle 14 is in communication with the accessory unit 53. While a song is playing on the radio, a passenger in the vehicle activates a button on the accessory unit 53. In response, the radio 51 and/or accessory unit 53 captures the RDS information about the song currently playing and creates a tag with this information. If RDS information is not available, location information (e.g., GPS coordinates), station information, and a portion of the song can also be used. The tag is stored in the radio 51 or accessory unit 53. Over time, multiple tags can build up and be grouped into one or more playlists.

In step S2, tags are transferred to a telematics unit 15 that is part of the vehicle 14. The transfer occurs over the vehicle bus 65. This transfer can occur at periodic intervals or in response to an action of a passenger in the vehicle. For example, if the number of tags stored in the accessory unit 53 exceeds a predetermined threshold (e.g., ten) the tags are automatically transferred to and stored in the telematics unit 15 for further processing. In another example, the tags are pulled from the accessory unit 53 in response to a passenger action such as the activation of a "send" button on the accessory unit 53 or the telematics unit 15.

Prior to transmitting the tags to a server of a network 10, the telematics unit 15 is associated with the with the mobile subscribers account. The association can be accomplished in many ways. For example, the subscriber can log into their account on the customer account web server 41 and associate the telematics unit 15 in their vehicle with their account. In another example, the thin client application 222 on the PMD 16 can be used to associate the telematics unit with the mobile subscriber associated with the PMD 16.

In step S3, the tags are transferred to a server of the network 10. The telematics unit 15 is provisioned to transfer the tags to a server on the network 10. The transfer of tags from the telematics unit 15 to a server on the network 10 can occur in response to any number of events. For example, the transfer can result from the activation of a "send" button on the telematics unit 15 or the accessory unit 53. Also, the transfer can occur when the vehicle 14 is turned on or off as part of the telematics unit 15 registration and deregistration process with the network 10. Also, the transfer can occur at predetermine intervals. For example, every hour, every two hours, every twelve hours, or when the number of tags stored in the telematics unit 15 exceeds a predetermined threshold (e.g., twelve).

The transfer to the network server from the telematics unit can occur using known wireless communication techniques. For example, SMS messaging can be used as described above with respect to FIG. 2. As part of the transfer of the tags, an account identifier (e.g., an MDN associated with the subscriber) is also transmitted to the network server. In some instances, a short code is assigned to the network server that receives the tags. Thus, the telematics unit uses this short code in the outgoing SMS message. Of course, other types of transfers can occur depending the type of network 10 and the capabilities of the telematics unit 15. One example includes a packet based transfer of the tags can occur if the network 10 permits.

The network server receives the tags from the telematics unit and associates them with the PMD 16 user's account on the server. In some instances, the tags are also forwarded to one or more third party application servers 45, 47, and 49 for further processing an interaction. For example, a tag that includes actual clips of a song can be forwarded to media determination server 49. In turn, the media determination server 49 determines who the artist of the tagged media is and the name of the song and returns this information to the network server. In another example, the list of tags is forwarded to a social network server 47 for publication via the PMD user's account on that social networking site. Specifically, the list of tags can be transferred and published via Facebook or MySpace.

In step S4, the account subscriber accesses the network server using the thin client application 222 executing on the PMD 16. Upon accessing the account, the subscriber is shown a list of the tags transferred from the telematics unit 15. The subscriber can manipulate the tags in many ways using the thin client application 222. For example, the subscriber can indicate whether they wish to purchase or rent a tagged song. Also, the subscriber can organize the tags into one or more playlists. Further, the subscriber can manipulate existing playlists associated with their account.

The subscriber can also manipulate other account settings using the thin client 222 of the PMD 16. For example, the end user can configure whether to transfer the tags to additional media providers (e.g., Rhapsody, Napster, iTunes). The subscriber can also configure whether and where to publish their playlists (e.g., to social network server 47). Also, the subscriber can associate one or more telematics units with their account using the thin client 222 of the PMD 16. Of course, the above-described parameters can also be configured and manipulate using other methods such the above-described MyAccount website.

In step S5, media that was indicated for transfer to the PMD 16 during the thin client session is transferred to the PMD 16.

In some cases, the songs that were purchased during the thin client session are transferred to the PMD 16 via the network 10. In instances, the media store/ODS server 39 can transfer the purchased or rented music to the PMD 16. In other instances, the media store/ODS 39 may not have access to some of the tagged media due to licensing issues. Thus, the media can be retrieved from one of the third party media service providers 45. In such a situation, the revenue generated from the purchase can be shared among the network carrier and the third party media service 45. The transfer from the network server 10 can occur during a thin client access session or at the end of the thin client session. The transfer can occur using known communications protocols. The transfer to the PMD 16 may occur over the network 10 or through another network such as the Internet 29.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer (PC) or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of media information capture and interaction outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, relevant software can be communicated to PMD 16, to the appropriate network server, to the telematics unit and/or to the accessory device (FIG. 4). Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Appendix: Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

μP: microprocessor
3GPP: 3rd generation partnership project
3GPP2: 3rd generation partnership project 2
AM: amplitude modulation
BS: base station
BTS: base transceiver system
CDMA: code division multiple access
CD-ROM: compact disc read-only memory
digital versatile (video) disc read-only memory
DRT: destination routing table
DVD: digital video disk
DVD-ROM: digital versatile (video) disc read-only memory
EMS: enhanced messaging service
EPROM: erasable programmable read-only memory
EV-DO: evolution-data optimized
FLASH-EPROM: flash erasable programmable read-only memory
FM: frequency modulation
GPS: global positioning system
GSM: global system for mobile communications
GW: gateway
HD: high definition
HLR: home location register
HTMP: hypertext mail protocol HTTP: hyper-text transfer protocol
I/O: input/output
IMSI: international mobile subscriber identity
IP: internet protocol
IR: infrared
LTE: long term evolution
MC: message center
MDN: mobile directory number
MIN: mobile identification number
MMS: multi-media messaging service
MR: message register
MS: mobile station
MSC: mobile switching center
NAD: network access device
ODS: on-demand server
PC: personal computer
PCS: personal communication services
PDA: personal digital assistant
PDSN: packet data switch node
PMD: personal media device
PN: pseudorandom number
PSTN: public switched telephone network
RAM: random access memory
RAN: radio access network
RDBS: radio broadcast data system
RDS: radio data system
RF: radio frequency
ROM: read-only memory
SIP: session initiation protocol
SMDPP: SMS delivery point-to-point
SMPP: simple messaging service point-to-point
SMS: simple messaging service
SMSC: short message service center
SMSREQ: SMS request
SS7: signaling system 7
STP: signaling transfer points
TCP: transmission control protocol
TCU: telematics control unit
TDMA: time division multiplexing
UMTS: universal mobile telecommunications system
VLR: visitor location register
WAN: wide area network
WIG: wireless internet gateway
XCVR: transceiver
XML: extensible markup language

What is claimed is:

1. A method of creating a list of media items of interest to a mobile communication network subscriber, the method comprising:
receiving, over a mobile communications network air interface and from a telematics unit of a vehicle that is equipped with the telematics unit, a list including a plurality tags representing a respective plurality of broadcast media items transferred from an accessory unit to the telematics unit, before transmission over the network air interface, in a communication channel of the mobile communications network associated with the telematics unit, the communication channel being separate from any channel associated with a mobile device account of the subscriber, the transmission further including an identifier of the mobile device account of the mobile communications network subscriber, each received tag providing one or more parameters for identification of a respective one of the broadcast media items including at least a name of the broadcast media item and an artist of the broadcast media item;
storing the received list of tags at a server of the mobile communications network in the mobile device account of the mobile communications network subscriber;
responsive to user interaction with the mobile device account on the server, processing the stored list of tags to generate a playlist; and
communicating at least a portion of the playlist, from the server to a personal media device, upon access by the personal media device to the mobile device account of the mobile communications network subscriber,
wherein the accessory unit is located separate from the telematics unit and the personal media device is separate from the telematics unit and the accessory unit.

2. The method of claim 1, further comprising receiving, at the server, a purchase request for a media item in the playlist from the personal media device.

3. The method of claim 2, further comprising initiating a transaction to purchase the media item and transmitting, via the server, the purchased media item to the personal media device in response to the purchase request.

4. The method of claim 3, further comprising receiving the media item indicated in the purchase request from a third party content provider for the transmission to the personal media device.

5. The method of claim 1, further comprising communicating the generated playlist to one or more persons other than the mobile communications network subscriber.

6. The method of claim 1, further comprising communicating the generated playlist to one or more content providers associated with the mobile device account holder of the mobile communications network.

7. The method of claim 1, wherein receiving, over the mobile communications network, the list of tags comprises receiving a simple messaging service (SMS) message over the mobile communications network air interface the list of tags directly from the telematics unit.

8. The method of claim 1, wherein communicating from the server to the personal media device comprises communicating the at least the portion of the playlist from the server to the personal media device via a simple messaging service (SMS) message.

9. The method of claim 1, wherein communicating from the server to the personal media device comprises communicating the at least the portion of the playlist from the server to the personal media device via a thin client application executing on the personal media device.

10. A method comprising steps of:
activating a portion of an accessory unit during a broadcast of respective first and second media items;
capturing, by the accessory unit in response to the activation, tag information related to the respective first and second broadcast media items, the tag information providing one or more parameters for identification of the first and second broadcast media items including at least a name of each of the first and second broadcast media items and an artist of each of the first and second broadcast media items;
storing the captured tag information for the first and second media items in the accessory unit;
transferring the stored tag information from the accessory unit to a telematics unit associated with a vehicle via a wired electrical connection between the accessory unit and the telematics unit;
transmitting, from the telematics unit to a server of a mobile communications network, over a mobile communications network air interface, in a communications channel associated with the telematics unit the channel being separate from any channel associated with a mobile device account of the subscriber, the transmission including the tag information along with an identifier of the mobile device account of a mobile communications network subscriber;

storing the tag information by the server in the mobile device account corresponding to the account identifier;

initiating a communication session between a personal media device and the server via the mobile communication network;

accessing the tag information stored at the server by the personal media device, initiating, via the server and in response to a request from the personal media device during the session, a transaction to purchase one of the first or second media items corresponding to the tag information; and transmitting, via the server, the purchased media item to the personal media device;

wherein the accessory unit is located separate from the telematics unit and the personal media device is separate from the telematics unit and the accessory unit.

11. The method of claim 10, further comprising receiving the purchased media item, by the personal media device, in response to the purchase request.

12. The method of claim 10, further comprising communicating the tag information to one or more persons other than the mobile communications network subscriber.

13. The method of claim 10, wherein transmitting the tag information over the mobile communications network comprises transmitting the tag information via a simple messaging service (SMS) message over the mobile communications network air interface directly from the telematics unit.

14. The method of claim 10, wherein the step of transmitting to the personal media device is responsive to accessing of the server via a thin client application executing on the personal media device to obtain the tag information stored by the server.

15. The method of claim 10, wherein transferring the list of tags from the accessory unit to the telematics unit occurs in response to an event selected from the group consisting of: the storage capacity of the accessory unit exceeding a threshold, the expiration of a predetermined time interval, the activation of a manual transfer command, and the connection of the accessory unit to the telematics unit.

16. The method of claim 15, further wherein transferring the list of tags from the telematics unit over the network air interface occurs in response to an event selected from the group consisting of: the storage capacity of the telematics unit exceeding a threshold, the expiration of a predetermined time interval, the activation of a manual transfer command, and the connection of the telematics unit to the network.

17. The method of claim 16, wherein the event that causes transfer of the list of tags from the accessory unit to the telematics unit is different from the event that causes transfer of the list of tags from the telematics unit over the network air interface.

18. The method of claim 10, wherein:
the accessory unit is integral with or in communication with a radio in the vehicle, and
the telematics unit is configured to provide emergency and other vehicle related services, in addition to functions related to receiving and transmitting the tag.

19. The method of claim 18, wherein the telematics unit is further configured to communicate via the mobile communications network via the communications channel in a manner similar to a mobile station.

20. The method of claim 18, further comprising:
receiving the broadcast media item and the information related to the media item broadcast over the air via the radio in the vehicle,
wherein the capturing step comprises the accessory unit capturing the name of the broadcast media item and the artist of the broadcast media item from the information received over the air via the radio in the vehicle.

21. A method of creating a list of media items of interest to a mobile communication network subscriber, the method comprising:
receiving, over a mobile communications network air interface and from a telematics unit of a vehicle that is equipped with the telematics unit, a list including a plurality of tags representing a respective plurality of broadcast media items transferred from an unit to the telematics unit before transmission to the network air interface, in a communications channel associated with the telematics unit, the channel being different from any channel associated with a mobile device account of the subscriber, the transmission further including and an identifier of the mobile device account of the mobile communications network subscriber, each received tag providing one or more parameters for identification of a respective one of the broadcast media items, including at least a portion of the broadcast, GPS location information related to where the broadcast was received, and temporal information related to when the at least a portion of the broadcast was captured;
storing the received list of tags at a server in the mobile device account of the mobile communications network subscriber;
processing the parameters of each tag to identify at least a respective name of the broadcast media item and a respective artist of the broadcast media item and storing the name and artist as a part of the respective tag in the mobile device account at the server;
responsive to user interaction with the mobile device account on the server, processing the stored list of tags to generate a playlist; and
communicating at least a portion of the playlist, from the server to a personal media device, upon access by the personal media device to the mobile device account of the mobile communications network subscriber,
wherein the accessory unit is located separate from the telematics unit and the personal media device is separate from the telematics unit and the accessory unit.

22. A system, comprising:
a radio or accessory unit configured for operation in a vehicle, the radio or accessory unit comprising: a user input, a processor, and a wired electrical interface configured to provide data communication within the vehicle;
a telematics unit associated with the vehicle, the telematics unit comprising: a further wired electrical interface configured to provide data communication within the vehicle with the wired electrical interface of the radio or accessory unit and with one or more other on-board elements of the vehicle, a processor, and a wireless transceiver configured to provide communications for the telematics unit over a mobile communication network via a telematics communications channel; and
a server computer comprising a processor and a data communication interface, wherein:
the processor of the radio or accessory unit configures the radio or accessory unit to implement functions including functions to: capture a plurality of tags of information related to a respective plurality of broadcast media items, in response to a respective plurality of activations of the user input during the broadcast of the plurality of the media item, each tag providing one or more parameters for identification of the respective media item; to store the plurality of tags and to supply the plurality of tags as a list to the telematics unit via the electrical interface;

the processor of the telematics unit configures the telematics unit to implement functions including functions to: receive the plurality of tags from the radio or accessory unit; and transmit, via the telematics communication channel, the plurality of tags and an identifier of a mobile device account of a mobile communications network subscriber via the mobile communication network to the server computer;

the processor of the server computer configures the server computer to implement functions including functions to receive and store the plurality of tags transmitted by the telematics unit in a mobile device account of the mobile communications network subscriber, the telematics communication channel being different from any channel associated with the mobile device account of the mobile communications network subscriber; initiate a communication session between the server computer and a personal media device of the subscriber; and transmit the stored plurality of tags to the personal media device; and the radio or accessory unit is separate from the telematics unit and the personal media device is separate from the telematics unit and the radio or accessory unit.

23. The system of claim 22, wherein the processor of the radio or accessory unit further configures the radio or accessory unit to capture, for each of the plurality of broadcast media items at least a name of the broadcast media item and an artist of the broadcast media item, as the information related to the media item for the tag.

24. The system of claim 22, wherein the processor of the radio or accessory unit device further configures the radio or accessory unit to capture at least a portion of the broadcast, global positioning system (GPS) location information related to where the broadcast was received, and temporal information related to when the portion of the broadcast was captured, as the information related to the each of the media items as the tag for the respective media item.

25. The system of claim 22, wherein the capture function of the radio or accessory unit comprises automatically capturing at least some of the information related to each media item for inclusion in the tag for the media item from information received over the air with the broadcast.

26. The system of claim 22, wherein:
the functions of the server computer further comprise a function to process each of the tags, responsive to subscriber interaction, to generate a playlist for the subscriber, the playlist including identification of the media items identified from the respective tags; and
the transmit function of the server computer includes a function to transmit at least a portion of the playlist including the identification of the media items.

27. The system of claim 26, wherein the functions of the server computer further comprise functions to:
receive a purchase request for one of the plurality of the media items as identified in the playlist, during the communication session;
initiate a transaction to purchase the media item; and
initiate a transmission of the purchased media item to the personal media device.

28. The system of claim 27, where the function to initiate a transmission includes:
receiving the media item from a system of a third party content provider; and
transmitting the received media item to the personal media device through the mobile communication network.

29. The system of claim 22, wherein the telematics unit is further configured to automatically communicate a report via the telematics communication channel of the mobile communications network responsive to detection of a crash of the vehicle.

30. The system of claim 22, wherein the telematics unit is provisioned for services that are limited compared to wireless network services provisioned for a mobile station of the wireless network.

31. The system of claim 30, wherein the services for which the telematics unit is provisioned consist of sending and receiving voice messages, sending and receiving short messaging service (SMS) messages between the telematics unit and telematics service providers or on-demand multimedia servers.

* * * * *